US008589603B2

(12) United States Patent
Craddock et al.

(10) Patent No.: US 8,589,603 B2
(45) Date of Patent: Nov. 19, 2013

(54) DELAYING ACKNOWLEDGMENT OF AN OPERATION UNTIL OPERATION COMPLETION CONFIRMED BY LOCAL ADAPTER READ OPERATION

(75) Inventors: David Craddock, New Paltz, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 12/871,532

(22) Filed: Aug. 30, 2010

(65) Prior Publication Data
US 2012/0054381 A1 Mar. 1, 2012

(51) Int. Cl.
G06F 3/00 (2006.01)
G06F 13/28 (2006.01)
G06F 13/00 (2006.01)
G06F 13/42 (2006.01)

(52) U.S. Cl.
USPC ........... 710/28; 710/1; 710/22; 710/100; 710/105; 710/106

(58) Field of Classification Search
USPC ................ 710/28, 1, 22, 100, 105, 106
See application file for complete search history.

(56) References Cited

U.S. PATENT DOCUMENTS

| | | | | |
|---|---|---|---|---|
| 4,716,523 A * | 12/1987 | Burrus et al. | | 710/28 |
| 5,068,781 A * | 11/1991 | Gillett et al. | | 710/108 |
| 5,210,829 A * | 5/1993 | Bitner | | 710/57 |
| 5,544,331 A * | 8/1996 | Kolb | | 710/315 |
| 5,572,687 A * | 11/1996 | Alnuweiri | | 710/123 |
| 6,397,315 B1 * | 5/2002 | Rahman et al. | | 711/169 |
| 6,647,450 B1 * | 11/2003 | Kaplinsky | | 710/300 |
| 6,782,433 B2 * | 8/2004 | Mino | | 710/22 |
| 6,842,840 B1 * | 1/2005 | Reohr et al. | | 711/172 |
| 6,917,987 B2 * | 7/2005 | Parthasarathy et al. | | 709/249 |
| 6,920,510 B2 * | 7/2005 | Chang et al. | | 710/36 |
| 6,948,004 B2 * | 9/2005 | Gasbarro et al. | | 709/250 |
| 7,133,943 B2 * | 11/2006 | Carnevale et al. | | 710/52 |
| 7,143,410 B1 * | 11/2006 | Coffman et al. | | 718/100 |
| 7,155,537 B1 * | 12/2006 | Weber et al. | | 709/249 |
| 7,558,839 B1 * | 7/2009 | McGovern | | 709/218 |
| 7,685,335 B2 * | 3/2010 | Arndt et al. | | 710/56 |
| 7,895,390 B1 * | 2/2011 | Olson | | 711/101 |
| 7,934,025 B2 * | 4/2011 | Sapp et al. | | 710/22 |
| 2002/0159385 A1 * | 10/2002 | Susnow et al. | | 370/229 |

OTHER PUBLICATIONS

"InfiniBand Architecture Specification," vol. 1, Release 1.2.1, Nov. 2007.

* cited by examiner

Primary Examiner — Idriss N Alrobaye
Assistant Examiner — Getente A Yimer
(74) Attorney, Agent, or Firm — John E. Campbell; Blanche E. Schiller, Esq.; Heslin Rothenberg Farley & Mesiti P.C.

(57) ABSTRACT

A request to perform an operation, such as a remote direct memory access (RDMA) write operation or a send operation that writes to memory, is sent from a sending input/output (I/O) adapter (e.g., an RDMA-capable adapter) to a receiving I/O adapter. The receiving I/O adapter receives the request and initiates performance of the operation, but delays sending an acknowledgment for the operation. The acknowledgment is delayed until the operation is complete (i.e., until the memory is updated and the data is visible to the remote processor), as determined by a read operation initiated and performed by the receiving I/O adapter transparent to the sending I/O adapter.

19 Claims, 8 Drawing Sheets

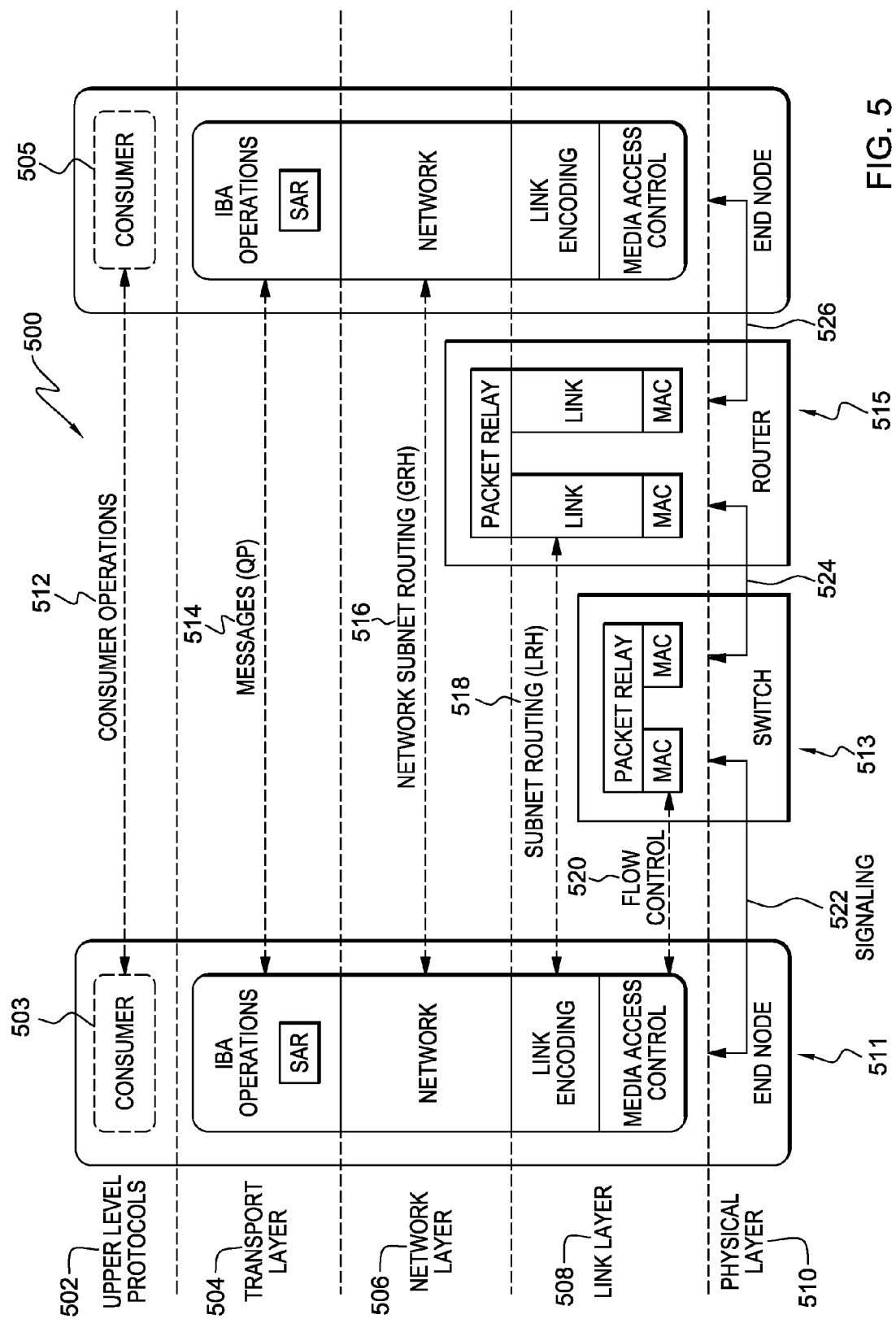

DELAYING ACKNOWLEDGMENT OF AN OPERATION UNTIL OPERATION COMPLETION CONFIRMED BY LOCAL ADAPTER READ OPERATION

BACKGROUND

This invention relates, in general, to processing within a computing environment, and in particular, to facilitating processing associated with input/output (I/O) adapters.

I/O adapters, such as remote direct memory access (RDMA)-capable adapters, communicate with one another to have certain operations performed. In one example, a sending RDMA-capable adapter forwards an RDMA write operation to a remote receiving RDMA-capable adapter. Responsive to receiving the RDMA write operation, the receiving RDMA adapter acknowledges the write operation. This acknowledgment, however, only guarantees reception of the request at the remote adapter. It does not guarantee that the remote adapter has completed the memory write operation nor that the written data is visible to the remote processor.

Applications that use RDMA write operations to communicate often need to confirm that the data is available in the remote memory prior to performing certain other operations. Thus, an RDMA read operation is forwarded from the sending RDMA adapter to the remote adapter in order to perform a memory read operation to confirm that the data is available in memory (visible to the remote processor). If the data is available, then the remote adapter forwards another acknowledgment (the RDMA read data) to the sending adapter. The requirement of the remotely initiated read to confirm that the data is available and the sending of another acknowledgment increases latency among the adapters.

BRIEF SUMMARY

The shortcomings of the prior art are overcome and additional advantages are provided through the provision of a computer program product for facilitating processing in a computing environment. The computer program product includes a storage medium readable by a processing circuit and storing instructions for execution by the processing circuit for performing a method. The method includes, for instance, receiving at a receiving adapter of the computing environment from a sending adapter of the computing environment an operation to be performed by the receiving adapter; performing the operation by the receiving adapter; determining by the receiving adapter whether the operation has completed, wherein the determining comprises performing by the receiving adapter a read operation to confirm the operation has completed, the read operation initiated locally by the receiving adapter; and responsive to determining via the read operation that the operation has completed, sending an acknowledgment to the sending adapter.

In a further aspect, a computer program product for facilitating processing in a computing environment is provided. The computer program product includes a storage medium readable by a processing circuit and storing instructions for execution by the processing circuit for performing a method. The method includes, for instance, receiving at a receiving adapter of the computing environment from a sending adapter of the computing environment a first operation to be performed by the receiving adapter, the first operation being associated with a first acknowledgment type; performing the first operation by the receiving adapter; responsive to the first acknowledgment type indicating non-delayed acknowledgment, sending a receipt acknowledgment to the sending adapter indicating receipt of the first operation, the receipt acknowledgment not indicating completion of the first operation; receiving at the receiving adapter from the sending adapter a second operation to be performed by the receiving adapter, the second operation being associated with a second acknowledgment type; performing the second operation by the receiving adapter; responsive to the second acknowledgment type indicating delayed acknowledgment, determining by the receiving adapter whether the second operation has completed, wherein the determining comprises performing by the receiving adapter a read operation to confirm the second operation has completed, the read operation initiated locally by the receiving adapter; and responsive to determining via the read operation that the second operation has completed, sending a completion acknowledgment to the sending adapter.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts one example of a layered communication architecture to be used in a distributed computer system, in accordance with an aspect of the present invention;

DETAILED DESCRIPTION

In accordance with an aspect of the present invention, the sending of acknowledgments for requests received by a receiving adapter (e.g., an RDMA-capable adapter) are delayed until after a read operation initiated by the receiving adapter indicates completion of the requested operation (e.g., an RDMA write or send operation). Acknowledgment of the operation is delayed until the operation is complete; i.e., until the memory is updated (e.g., the data is visible to the remote processor), as indicated by the locally initiated read operation. This is in contrast to previous RDMA techniques in which the receiving adapter acknowledges the request upon receipt. That is, the acknowledgment merely guarantees reception at the remote adapter of the operation to be performed. It does not guarantee that the operation has completed or that the data is visible to the remote processor. By delaying the acknowledgement until the requested operation is performed, the sending adapter need not inquire as to whether the operation is complete, thus eliminating a request by the sending adapter and a corresponding acknowledgment. This improves latency between the adapters.

In one embodiment, the adapters involved in the processing are remote direct memory access (RDMA)-capable adapters. RDMA-capable adapters may be RDMA channel adapters, such as those defined by the InfiniBand™ Architecture Specification, or RDMA network interface cards (RNICs), such as those defined by iWARP from the RDMA Consortium. One embodiment of the InfiniBand™ Architecture Specification is described in detail in "InfiniBand™ Architecture Specification," Volume 1, Release 1.2.1, November 2007, which is hereby incorporated herein by reference in its entirety. Although references are made to RDMA and RDMA-capable adapters, it will be understood by those skilled in the art that one or more aspects of the present invention are not limited to operations that use RDMA.

Figure 1:
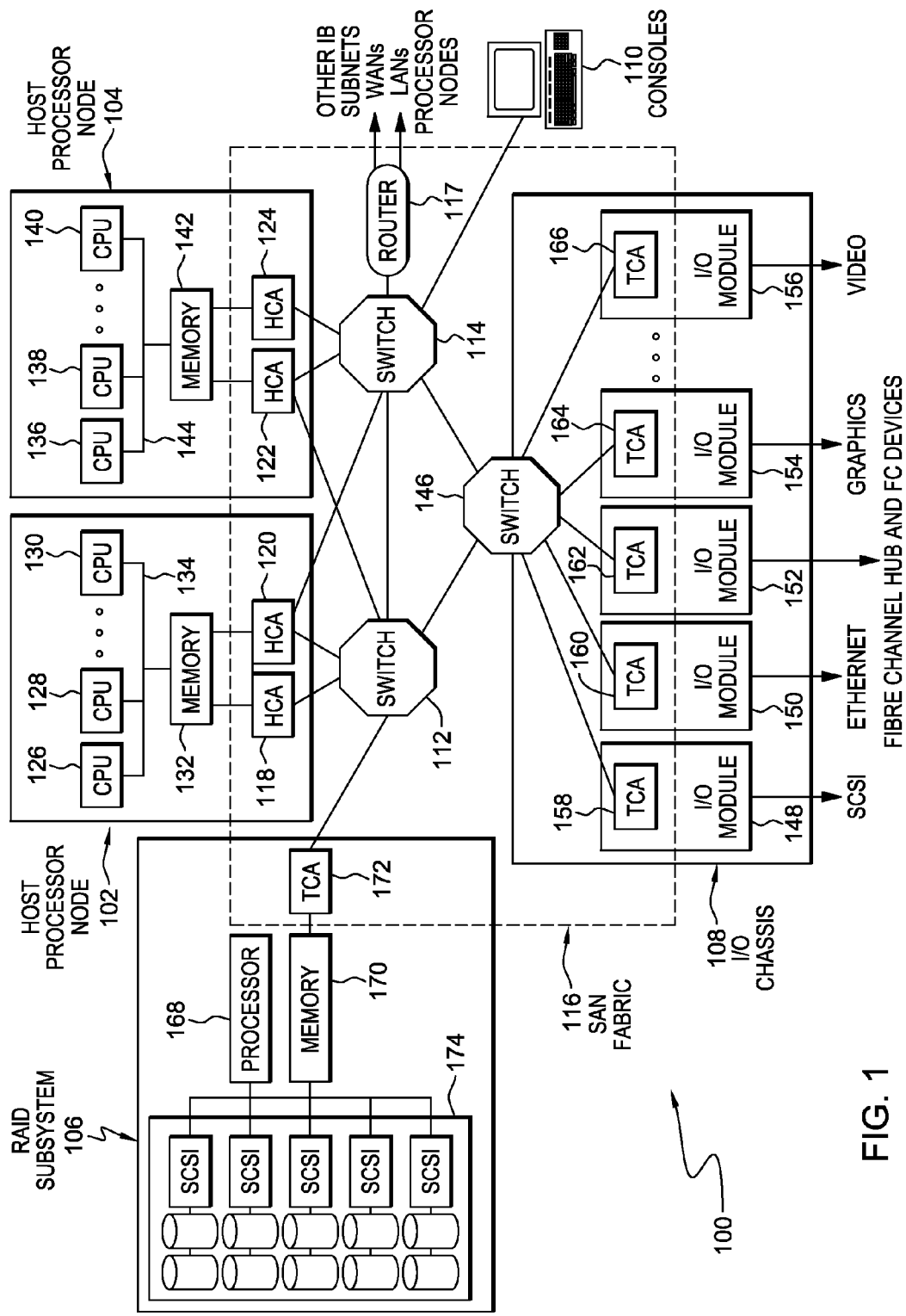
FIG. 1 depicts one example of a distributed computer system to incorporate and use one or more aspects of the present invention.

One embodiment of a computing environment to incorporate and use one or more aspects of the present invention is described with reference to FIG. 1. FIG. 1 depicts one example of a distributed computer system 100 that uses a System Area Network (SAN) fabric 116. Distributed computer system 100 and/or SAN fabric 116 are provided merely for illustrative purposes. One or more embodiments of the present invention can be implemented on computer systems of numerous other types and configurations. For example, computer systems implementing one or more embodiments can range from a small server with one processor and a few input/output (I/O) adapters to massively parallel supercomputer systems with hundreds or thousands of processors and thousands of I/O adapters.

Referring to FIG. 1, SAN fabric 116 is a high-bandwidth, low-latency network for interconnecting nodes within a distributed computer system. A node is any component attached to one or more links of a network and forming the origin and/or destination of messages within the network. In the example depicted in FIG. 1, distributed computer system 100 includes nodes in the form of a host processor node 102, a host processor node 104, a redundant array independent disk (RAID) subsystem node 106, and an I/O chassis node 108. The nodes illustrated in FIG. 1 are for illustrative purposes only, as SAN fabric 116 can interconnect any number and any type of independent processor nodes, I/O adapter nodes, and I/O device nodes.

Any one of the nodes can function as an end node, which is defined herein to be a device that originates or finally consumes messages or packets in SAN fabric 116. In one embodiment, an error handling mechanism is present which allows for reliable connection and/or reliable datagram communication between end nodes.

A message, as used herein, is an application-defined unit of data exchange, which is a primitive unit of communication between cooperating processes. A packet is one unit of data encapsulated by networking protocol headers and/or trailers. The headers generally provide control and routing information for directing the packet through SAN fabric 116. The trailer generally contains control and cyclic redundancy check (CRC) data to verify that packets are not delivered with corrupted contents.

The distributed computer system 100 depicted in FIG. 1 includes the communications and management infrastructure supporting both I/O and interprocessor communications (IPC) within a distributed computer system. The distributed computer system 100 includes, for instance, a switched communications fabric 116, which allows many devices to concurrently transfer data with high-bandwidth and low-latency in a secure, remotely managed environment. End nodes can communicate over multiple ports and utilize multiple paths through the SAN fabric 116. The multiple ports and paths through the SAN fabric 116 can be employed for fault tolerance and increased bandwidth data transfers.

In one example, SAN fabric 116 includes three switches 112, 114, and 146, and a router 117. A switch is a device that connects multiple links together and allows routing of packets from one link to another link within a subnet using a small header destination local identifier (DLID) field. A router is a device that connects multiple subnets together and is capable of routing packets from one link in a first subnet to another link in a second subnet using a large header destination globally unique identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In the example distributed computer system 100 illustrated in FIG. 1, host processor node 102, host processor node 104, and I/O chassis 108 include at least one RDMA-capable channel adapter (CA) to interface to SAN fabric 116. In one or more embodiments, each CA is an endpoint that implements the CA interface in sufficient detail to source or sink packets transmitted on SAN fabric 116. Host processor node 102 includes, for instance, CAs in the form of RDMA-capable host channel adapters (HCAs) 118 and 120. Host processor node 104 includes, for instance, HCAs 122 and 124. Host processor node 102 also includes central processing units 126-130 and a memory 132 interconnected by bus system 134. Host processor node 104 similarly includes central processing units 136-140 and a memory 142 interconnected by a bus system 144. In host processor node 102, memory 132 is communicatively coupled to HCAs 118 and 120 via, for instance, a peripheral component interconnect (PCI); and in host processor node 104, memory 142 is similarly communicatively coupled to HCAs 122 and 124 via, for instance, a PCI interconnect. HCAs 118 and 120 provide a connection from host processor node 102 to switch 112; while HCAs 122 and 124 provide a connection from host processor node 104 to switches 112 and 114.

In one or more embodiments, an HCA is implemented in hardware. In this implementation, the HCA hardware offloads much of the central processing unit I/O adapter communication overhead. This hardware implementation of the HCA also permits multiple concurrent communications over a switched network without the traditional overhead associated with communication protocols. In one embodiment, the HCAs and SAN fabric 116 in FIG. 1 provide the I/O and IPC consumers of the distributed computer system with zero processor-copy data transfers without involving the operating system kernel process, and employ hardware to provide reliable, fault tolerant communications.

As indicated in FIG. 1, router 117 is coupled to wide area network (WAN) and/or local area network (LAN) connections to other hosts or other routers. Further, I/O chassis 108 includes an I/O switch 146 and multiple I/O modules 148-156. In these examples, I/O modules 148-156 take the form of adapter cards. Example adapter cards include a SCSI adapter card for I/O module 148; an Ethernet adapter card for I/O module 150; an adapter card to fibre channel hub and fibre channel arbitrated loop (FC-AL) devices for I/O module 152; a graphics adapter card for I/O module 154; and a video adapter card for I/O module 156. Any known type of adapter card can be implemented. I/O adapters also include a switch in the I/O adapter to couple the adapter cards to the SAN fabric 116. These modules include RDMA-capable target channel adapters (TCAs) 158-166.

In the example depicted in FIG. 1, RAID subsystem node 106 includes a processor 168, a memory 170, a TCA 172, and multiple redundant and/or striped storage disk units 174. TCA 172 can be a fully functional HCA.

SAN fabric 116 handles data communications for I/O and interprocessor communications. SAN fabric 116 supports high-bandwidth and scalability required for I/O and also supports the extremely low latency and low CPU overhead required for interprocessor communications. User clients can bypass the operating system kernel process and directly access network communication hardware, such as HCAs, which enable efficient message passing protocols. SAN fabric 116 is suited to current computing models and is a building block for new forms of I/O and computer cluster communication. Further, in one embodiment, SAN fabric 116 allows I/O adapter nodes to communicate with each other or to communicate with any of the processor nodes in the distributed computer system. With an I/O adapter attached to SAN fabric 116, the resulting I/O adapter node has substantially the same communication capability as any host processor node in distributed computer system 100.

In one or more embodiments, SAN fabric 116 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both utilized for I/O and interprocessor communications. A typical I/O operation employs a combination of channel and memory semantics. For instance, a host processor node, such as host processor node 102, initiates an I/O operation by using channel semantics to send a disk write command to a disk I/O adapter, such as RAID subsystem TCA 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one or more embodiments, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
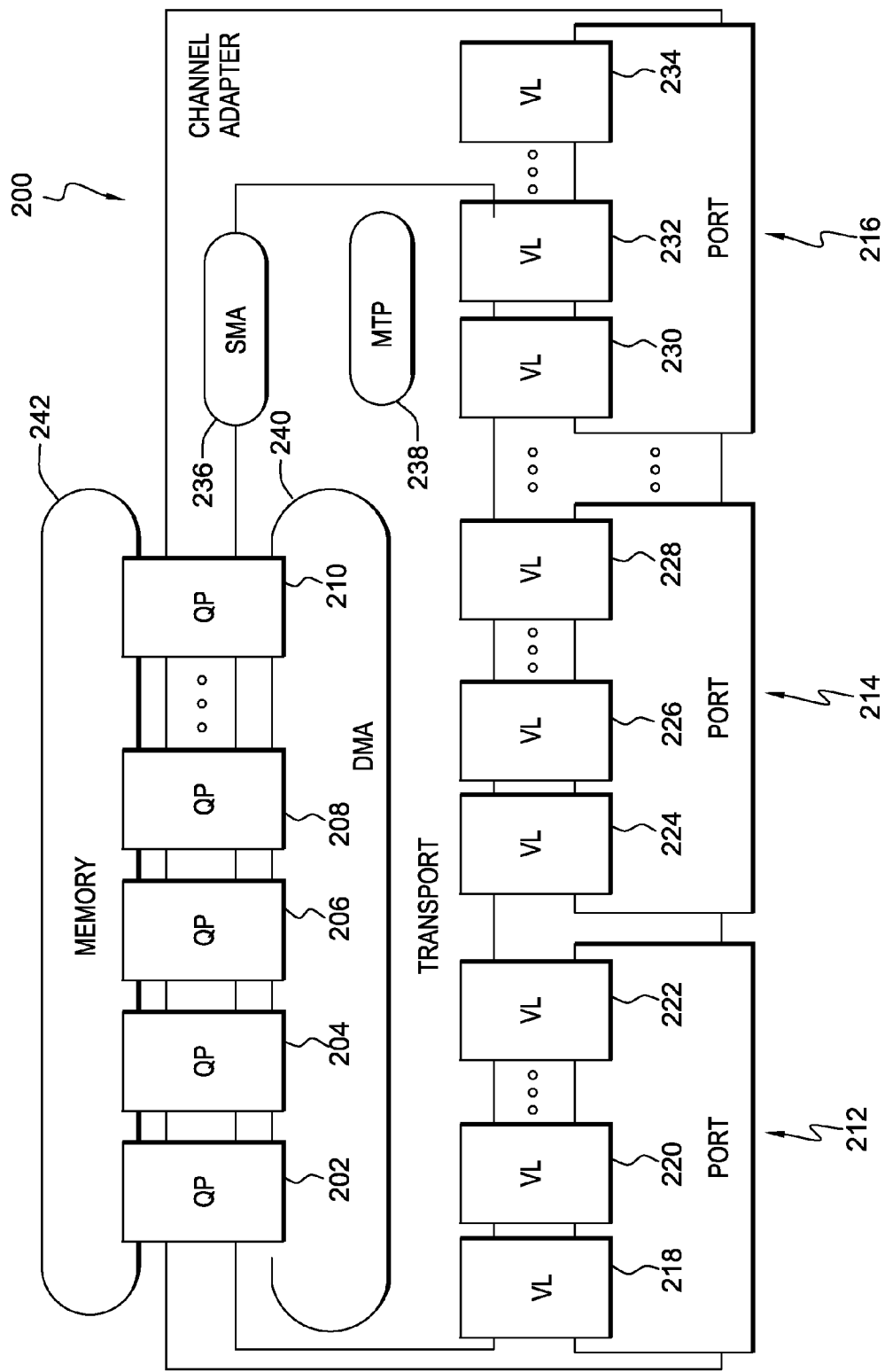
FIG. 2 depicts one embodiment of further details of a host channel adapter (HCA) of FIG. 1, in accordance with an aspect of the present invention.

With reference now to FIG. 2, further details regarding a host channel adapter are described. In one example, a host channel adapter (HCA) 200 includes a set of queue pairs (QPs) 202-210, which is used to transfer messages to the HCA ports 212-216. Buffering of data to HCA ports 212-216 is channeled through virtual lanes (VL) 218-234, where each VL has its own flow control. A subnet manager configures the channel adapter with the local addresses for each physical port, i.e., the port's local identifier (LID). A subnet manager agent (SMA) 236 is the entity that communicates with the subnet manager for the purpose of configuring the channel adapter. Memory translation and protection (MTP) 238 is a mechanism that translates virtual addresses to physical addresses and validates access rights. Direct memory access (DMA) 240 provides for DMA operations using memory 242 with respect to QPs 202-210.

A single channel adapter, such as HCA 200 shown in FIG. 2, can support thousands of QPs. By contrast, a TCA in an I/O adapter typically supports a much smaller number of QPs. Each QP includes, for instance, two work queues: a send queue (SQ) and a receive queue (RQ). The SQ is used to send channel and memory semantic messages. The RQ receives channel semantic messages. A consumer calls an operating system specific programming interface, which is herein referred to as a "verbs interface", to place work requests (WRs) onto a work queue.

Figure 3:
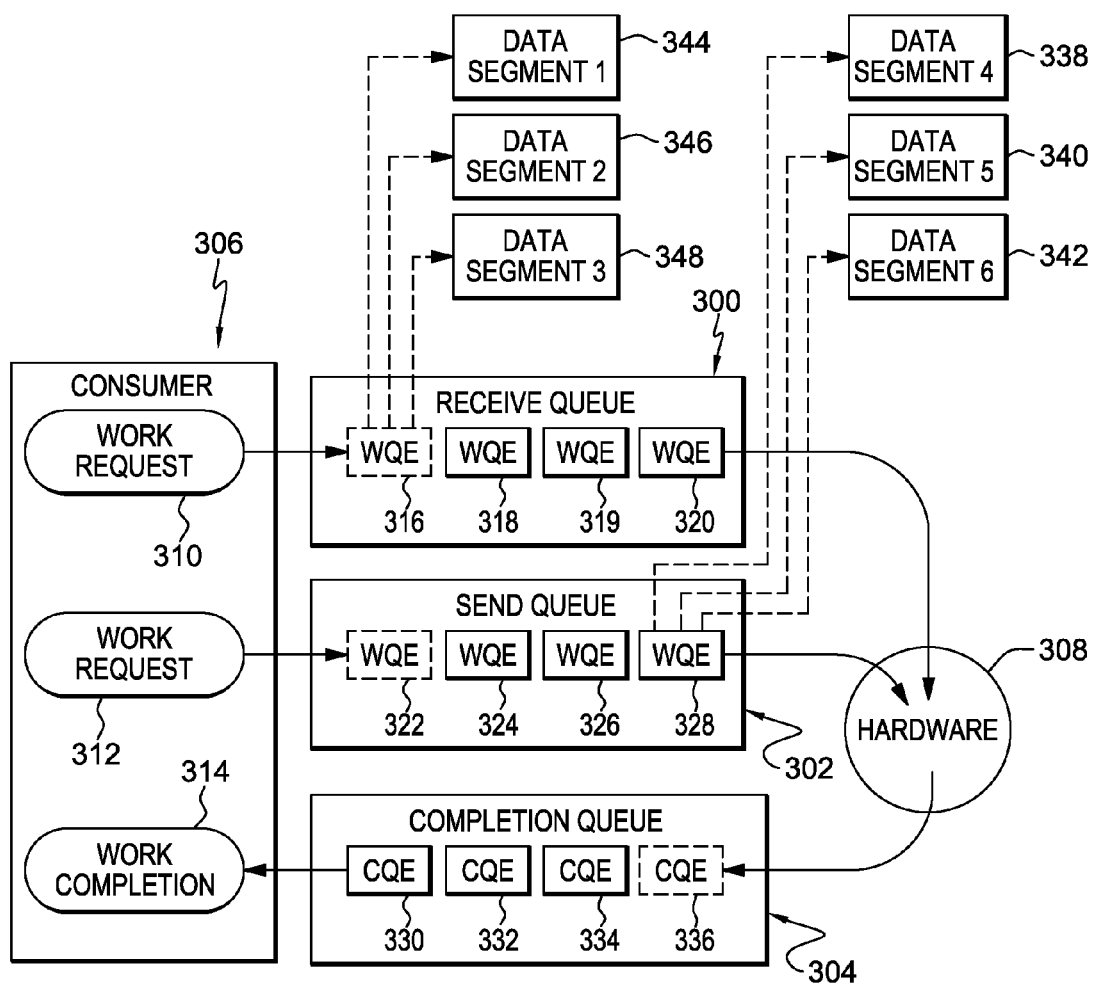
FIG. 3 depicts one example of processing work requests, in accordance with an aspect of the present invention.

With reference now to FIG. 3, further details regarding the processing of work requests are described. In the example of FIG. 3, a receive queue (RQ) 300, a send queue (SQ) 302, and a completion queue (CQ) 304 are present in memory for processing requests from and for consumer 306 (e.g., a process, such as a user process, executing within a central processing unit coupled to the HCA associated with the queues). These requests from consumer 306 are eventually sent to hardware 308 (which is coupled to hardware of another HCA, and that hardware is coupled to RQs, SQs and CQs of that other HCA). In this example, consumer 306 generates work requests 310 and 312 and receives work completion 314. Work requests placed onto a work queue are referred to as work queue elements (WQEs).

In one example, send queue 302 includes WQEs 322-328, describing data to be transmitted on the SAN fabric 116. Receive queue 300 includes WQEs 316-320, describing where to place incoming channel semantic data from the SAN fabric 116. A WQE is processed by hardware 308 in the HCA. Each QP is managed through a QP context, which is a block of information that pertains to a particular QP, such as the current WQEs, Packet Sequence Numbers, transmission parameters, etc.

The verbs interface also provides a mechanism for retrieving completed work from completion queue 304. As shown in FIG. 3, completion queue 304 includes completion queue elements (CQEs) 330-336. CQEs include information about previously completed WQEs. CQ 304 is used to create a single point of completion notification for multiple QPs. The CQE includes sufficient information to determine the QP and specific WQE that completed. A CQ context is a block of information that contains pointers to, length, and other information needed to manage the individual CQs.

An example work request supported by SQ 302 includes the following: A send work request, which is a channel semantic operation, pushes a set of local data segments to the data segments referenced by a remote node's receive WQE. For example, WQE 328 includes references to data segment 4 338, data segment 5 340, and data segment 6 342. Each of the send work request's data segments includes a virtually contiguous memory space. The virtual addresses used to reference the local data segments are in the address context of the process that created the local QP. Other types of operations that may be specified in the SQ WQE are RDMA write and RDMA read operations. These are memory semantic operations.

In one embodiment, RQ 300 supports one type of WQE, which is referred to as a receive WQE. The receive WQE provides a channel semantic operation describing a local memory space into which incoming send messages are written. The receive WQE includes a scatter list describing several virtually contiguous memory spaces. An incoming send message is written to these memory spaces. The virtual addresses are in the address context of the process that created the local QP.

For interprocessor communications, a user-mode software process transfers data through QPs directly from where the buffer resides in memory. In one or more embodiments, the transfer through the QPs bypasses the operating system and consumes few host instruction cycles. QPs permit zero processor-copy data transfer with no operating system kernel involvement. The zero processor-copy data transfer provides for efficient support of high-bandwidth and low-latency communication.

When a QP is created, the QP is set to provide a selected type of transport service. As examples, four types of transport services are supported: reliable connection, unreliable connection, reliable datagram, and unreliable datagram.

Figure 4:
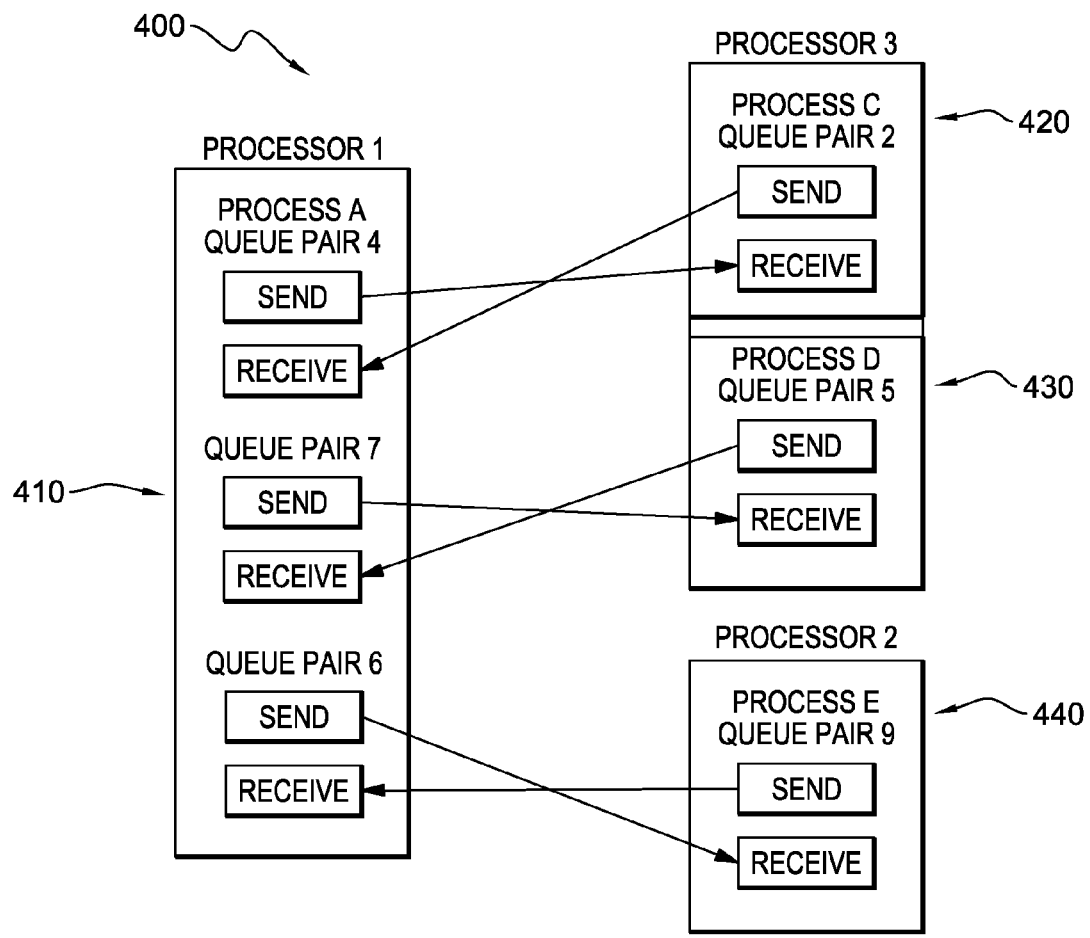
FIG. 4 depicts one embodiment of a portion of a distributed computer system in which queue pairs are used to provide a reliable connection service in communicating between distributed processes, in accordance with an aspect of the present invention.

A portion of a distributed computer system employing a reliable connection service to communicate between distributed processes is illustrated generally in FIG. 4. In one example, a distributed computer system 400 includes a host processor node 1, a host processor node 2, and a host processor node 3. Host processor node 1 includes a process A 410. Host processor node 3 includes a process C 420 and a process D 430. Host processor node 2 includes a process E 440.

Host processor node 1 includes QPs 4, 6, and 7, each having a send queue and a receive queue. Host processor node 2 has a QP 9 and host processor node 3 has QPs 2 and 5. The reliable connection service of distributed computer system 400 associates a local QP with one remote QP through configuring the local QP context to identify the remote QP by a port and a QP number. Thus, QP 4 is used to communicate with QP 2; QP 7 is used to communicate with QP 5; and QP 6 is used to communicate with QP 9.

A WQE placed on one QP in a reliable connection service causes data to be written into the receive memory space referenced by a receive WQE of the connected QP. RDMA operations operate on the address space of the connected QP.

In one or more embodiments, the reliable connection service is made reliable because hardware maintains sequence numbers and acknowledges all packet transfers. A combination of hardware and SAN fabric 116 driver software retries any failed communications. The process client of the QP obtains reliable communications even in the presence of bit errors, receive under runs, and network congestion. If alternative paths exist in the SAN fabric 116, reliable communications can be maintained even in the presence of failures of fabric switches, links, or channel adapter ports.

An example of a layered communication architecture 500 for use in a distributed computer system is generally illustrated in FIG. 5. The layered architecture diagram shows the various layers of data communication paths and organization of data and control information passed between layers.

HCA end node protocol layers (employed by end node 511, for instance) include upper level protocol 502 defined by consumer 503, a transport layer 504, a network layer 506, a link layer 508, and a physical layer 510. Switch layers (employed by switch 513, for instance) include link layer 508 and physical layer 510. Router layers (employed by router 515, for instance) include network layer 506, link layer 508, and physical layer 510.

The layered architecture 500 generally follows an outline of a classical communication stack. With respect to the protocol layers of end node 511, for example, upper layer protocol 502 employs the verbs interface to create messages at transport layer 504. Network layer 506 routes packets between network subnets 516. Link layer 508 routes packets within a network subnet 518. Physical layer 510 sends bits or groups of bits to the physical layers of other devices. Each of the layers is unaware of how the upper or lower layers perform their functionality.

Consumers 503 and 505 represent applications or processes that employ the other layers for communicating between end nodes. Transport layer 504 provides end-to-end message movement. As described above, the transport layer provides four types of transport services including, for instance: a reliable connection service; a reliable datagram service; an unreliable datagram service; and an unreliable connection service. Network layer 506 performs packet routing through a subnet or multiple subnets to destination end nodes. Link layer 508 performs flow-controlled, error checked, and prioritized packet delivery across links. Physical layer 510 performs technology-dependent bit transmission. Bits or groups of bits are passed between physical layers via links 522, 524, and 526. Links can be implemented with printed circuit copper traces, copper cable, optical cable, or with other suitable links.

As described above, adapters, such as host channel adapters, communicate with one another to perform certain operations, including remote direct memory access writes or sends. As part of this communication, acknowledgments are employed from one adapter to another. Further details regarding the performing of the operations, including providing the acknowledgments, are described with reference to FIGS. 6A and 6B. In particular, FIG. 6A depicts one embodiment of processing that employs acknowledgments absent one or more aspects of the present invention (non-delayed acknowledgments); and FIG. 6B depicts the use of delayed acknowledgments, in accordance with an aspect of the present invention.

Figure 6A:
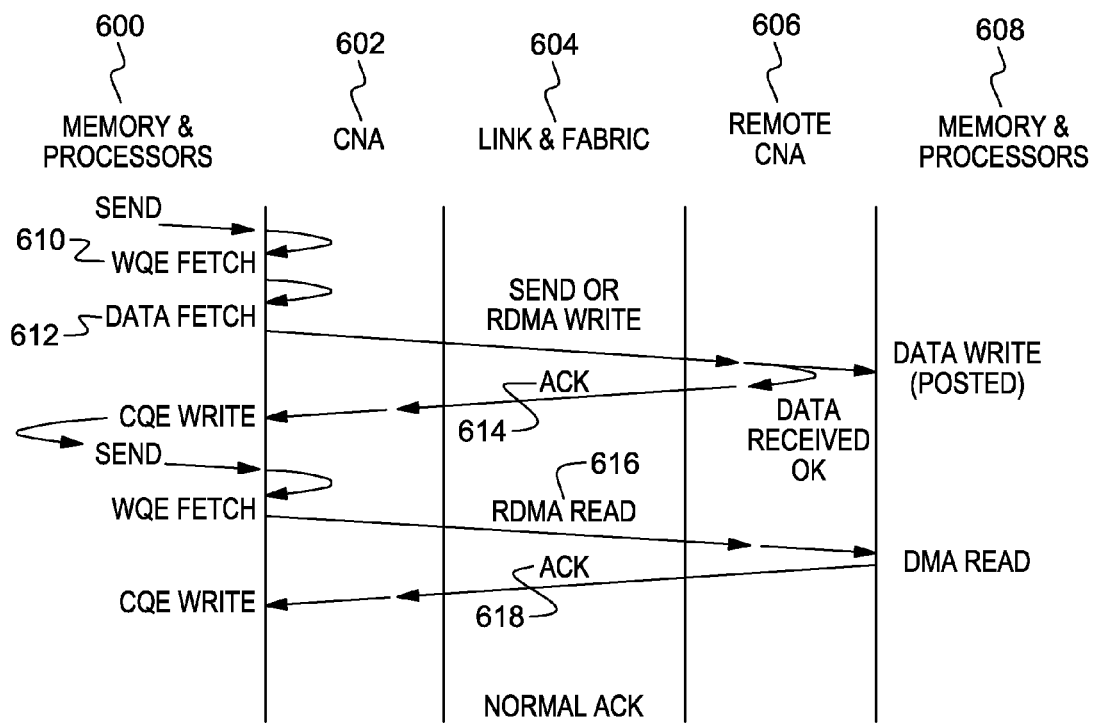
FIG. 6A depicts one example of acknowledgement processing associated with a send or memory write operation prior to one or more aspects of the present invention.
Figure 6B:
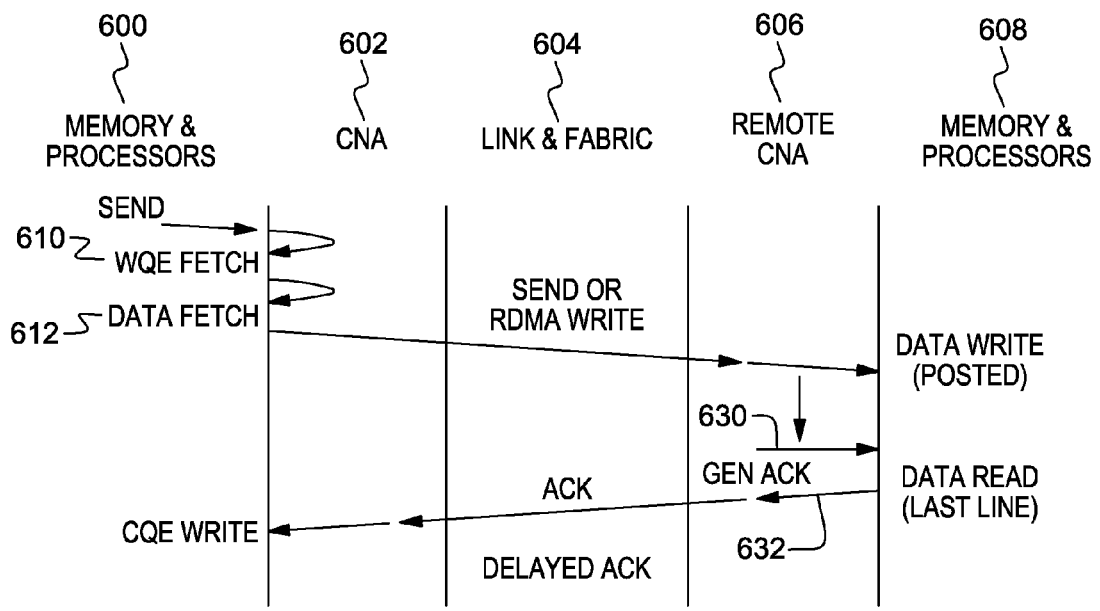
FIG. 6B depicts one embodiment of delayed acknowledgement processing of one or more aspects of the present invention.

Referring initially to FIG. 6A, a process executing on a processor 600 requests an operation to be performed, such as a memory write operation, like a send operation or an RDMA write operation. The request is placed in a work queue element (WQE), which is placed on a send queue in memory accessible by a sending adapter. A sending converged network adapter (CNA) 602, such as an RDMA-capable host channel adapter, fetches the WQE 610 and corresponding data 612 indicated by a pointer in the WQE, and builds a packet to be sent over a link and fabric 604 to a remote receiving CNA 606, such as another RDMA-capable host channel adapter. The remote adapter performs the write to memory. (For a send operation, the memory location to write the data is indicated in a receive WQE). The write to memory is a posted memory write request in the case of PCI (that is, there is no response to the DMA write). Further, the remote adapter sends an acknowledgment 614 back to the sending adapter. This acknowledgment indicates that the remote adapter received the request and data, but does not indicate that the data is present in remote memory. Responsive to receiving the acknowledgment, the sending adapter generates a CQE, which is placed on a completion queue. From the CQE, the application is notified that the work is complete (i.e., the write or send has been received at the remote adapter).

Subsequently, if the application wishes to determine whether the data is available to the remote processor (i.e., stored in memory), it issues an RDMA read operation 616 to a valid memory location (e.g., one of the locations written to by the write operation) to determine if the data is there. The remote adapter performs the RDMA read operation requested by the sending adapter. When the data is available, the remote adapter sends another acknowledgment (that is, the RDMA read data) 618 to the sending adapter indicating completion of the read operation. Responsive to receiving the acknowledgment, the sending adapter once again generates a CQE, which is placed on a completion queue to notify the application that the remote read request, generated by the sending adapter, was performed by the receiving adapter.

As described above, two acknowledgments, as well as a remote read operation initiated by the sending adapter and performed by the remote adapter, were used to indicate that a requested operation (e.g., memory write, send) was performed. The use of two acknowledgments and the remotely initiated read request increase latency between the adapters to perform the requested operations. Therefore, in accordance with an aspect of the present invention, a delayed acknowledgment technique is provided in which the remote adapter does not acknowledge the requested operation until it has been completed (e.g., the data is stored in memory and visible to the processor). One embodiment of the processing associated with delayed acknowledgments is described with reference to FIG. 6B.

Referring to FIG. 6B, as with the non-delayed acknowledgments of FIG. 6A, a process executing on processor 600 requests an operation to be performed, such as a send operation or an RDMA write operation. The request is placed in a work queue element (WQE) 610, which is placed on a send queue. Sending adapter 602 fetches WQE 610 and corresponding data 612 indicated by a pointer in the WQE, and builds a packet to be sent over link and fabric 604 to remote adapter 606. The remote adapter performs the write to memory, which is a posted memory write request, but does not send an acknowledgment at this time. Instead, the remote adapter performs a read operation 630 initiated locally by the remote adapter. This read is not requested by the sending adapter and is transparent to the sending adapter. The read operation is, for instance, a DMA read of the last byte or cache line of the RDMA write operation. Normal PCI ordering rules dictate that all preceding DMA writes are to complete before the DMA read data is returned. Responsive to the DMA read operation completing, which indicates that the data has been written to memory and visible by the remote processor, the remote adapter sends an acknowledgment 632 to the sending adapter. This acknowledgment, which is generated responsive to completion of the DMA read operation, guarantees that the data is in memory, since ordering rules adhered to by the interconnect (e.g., PCI) between the adapter and memory mandate that for the read to complete successfully, all the data is to have been stored in memory.

By sending only one acknowledgment when the write or send operation is complete and by avoiding a request being sent from the sender adapter to the remote adapter requesting the read, latency is decreased, and therefore, system performance is improved.

Figure 7:
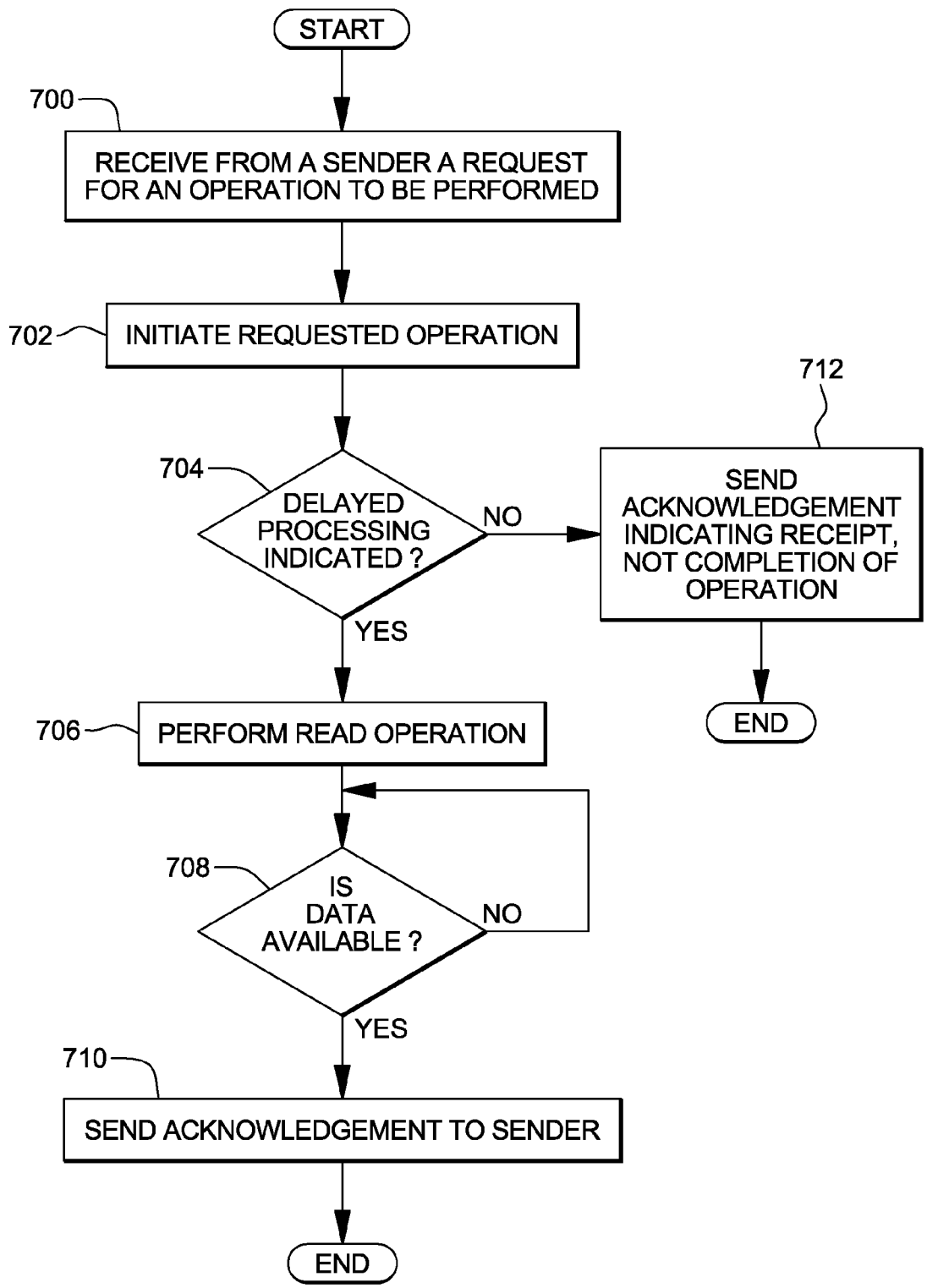
FIG. 7 depicts one embodiment of the logic associated with delaying acknowledgments, in accordance with an aspect of the present invention.

Further details regarding delayed acknowledgment processing are described with reference to FIG. 7. This processing is performed by the receiving adapter. Initially, the receiving adapter receives a request from a sending adapter to perform an operation, such as an RDMA write operation or a send operation, which writes data to memory, STEP 700. Responsive to the request, the receiving adapter commences the operation, STEP 702. For instance, it begins writing the data to memory. This write is a posted memory write request, in one example.

In this embodiment, the data is written over a PCI interconnect to memory. PCI, however, does not provide responses to DMA write operations. Further, the architecture of the adapter (e.g., InfiniBand™) specifies that if an acknowledgment is sent responsive to receiving the request, that the acknowledgment merely acknowledges receipt of the request and data by the adapter and does not guarantee that the data has been stored in memory. At this point, the receiving adapter may or may not send an acknowledgment.

In accordance with an aspect of the present invention, a determination is made as to whether delayed processing is indicated, INQUIRY 704. As examples, this determination may be made by checking an indicator in the queue pair context associated with the request or an indicator in the packet generated from the sending WQE. If delayed processing is indicated, then the receiving adapter, unbeknownst to the sending adapter, performs a local read operation to determine whether the data is stored in memory. The read operation is, for instance, a DMA read to the last memory location written to by the receiving adapter. In another example, the DMA read can be of another valid memory location (i.e., a previously written to memory location).

Should the read be successful indicating that the data is available in memory, INQUIRY 708, then an acknowledgment is sent to the sending adapter, STEP 710. This acknowledgment is thus delayed until after it is determined by the read operation that the data is available.

Returning to INQUIRY 708, if the data is currently unavailable, then the receiving adapter waits for the data to become available.

Returning to INQUIRY 704, if it is determined that delayed processing is not indicated (i.e., it is unavailable or not enabled for this particular queue pair or request), then the acknowledgment is sent indicating receipt of the write or send operation, STEP 712. The acknowledgment is not delayed and does not guarantee that the data has been written to memory by the write or send operation. This concludes processing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
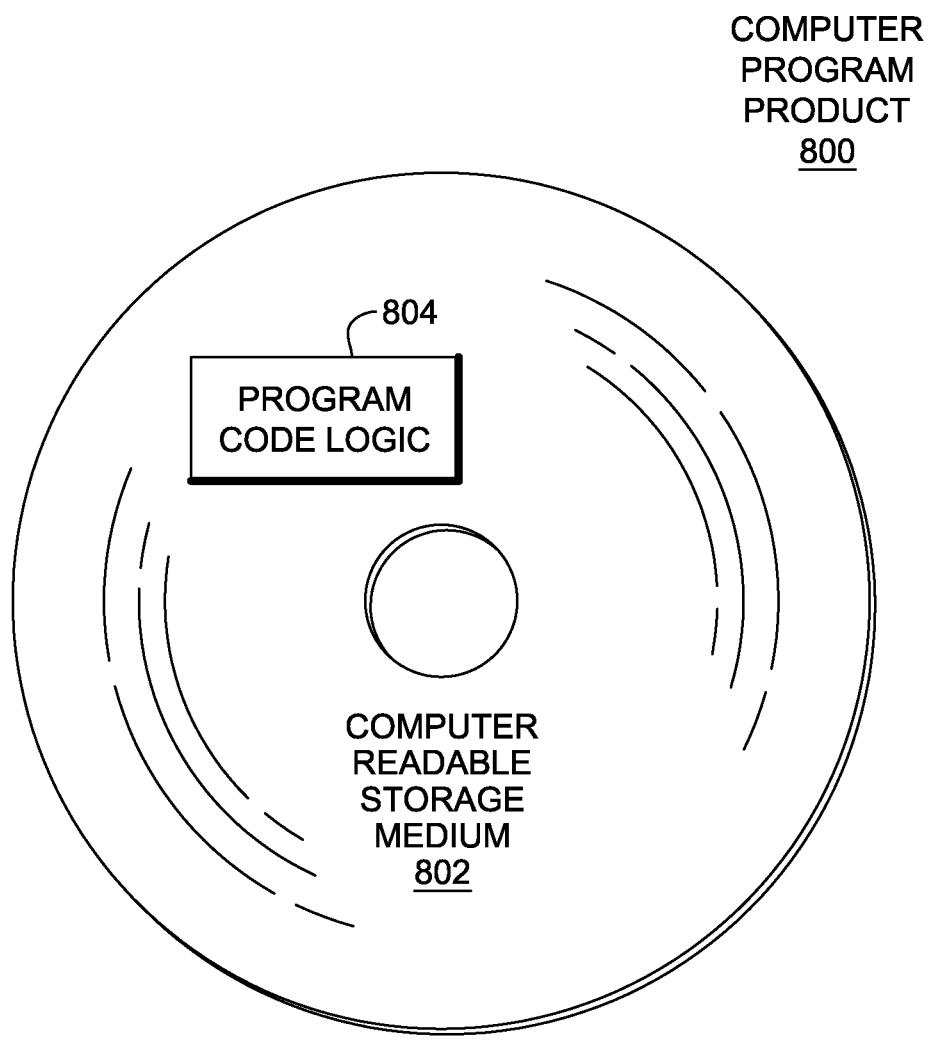
FIG. 8 depicts one embodiment of a computer program product incorporating one or more aspects of the present invention.

Referring now to FIG. 8, in one example, a computer program product 800 includes, for instance, one or more computer readable storage media 802 to store computer readable program code means or logic 804 thereon to provide and facilitate one or more aspects of the present invention. In one embodiment, the storage medium is tangible and non-transitory. In one example, the storage medium is a storage device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, one or more aspects of the present invention may pertain to operations other than memory writes and/or sends. Further, the memory writes need not be RDMA writes and/or the adapters may be other than RDMA-capable. Yet further, the interconnect between the adapters and memory may be other than PCI, including but not limited to, other interconnects that do not provide responses to memory writes. Further, the architecture of the adapters may be other than InfiniBand™. Many other variations are also possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating processing in a computing environment, the computer program product comprising a non-transitory computer readable storage medium readable by a processing circuit and storing instructions for execution by the processing circuit for performing a method, the method comprising:

receiving at a receiving adapter of the computing environment from a sending adapter of the computing environment a write operation to be performed by the receiving adapter;

performing the write operation by the receiving adapter to write data to memory of the computing environment;

determining by the receiving adapter whether the write operation has completed, wherein the determining comprises performing by the receiving adapter a read operation to confirm the write operation has completed in that the data has been written to the memory, the read operation initiated locally by the receiving adapter and reading only a portion of the data that has been written by the write operation to determine the write operation has completed, and wherein the read operation is absent a comparing of the written data and the read data; and based on determining via the read operation that the write operation has completed, sending an acknowledgment to the sending adapter.

2. The computer program product of claim 1, wherein acknowledgment of the write operation is delayed until after the read operation confirms completion of the write operation.

3. The computer program product of claim 2, wherein acknowledgment of the write operation prior to the read operation confirming completion of the write operation is avoided.

4. The computer program product of claim 1, wherein the memory is coupled to the receiving adapter via an interconnect that facilitates the write operation, the interconnect having a configuration in which indication of completion of the write operation to the sending adapter is absent.

5. The computer program product of claim 4, wherein the interconnect is a peripheral component interconnect (PCI).

6. The computer program product of claim 1, wherein the read operation reads one or more locations in memory written to by the write operation, and wherein the write operation is performed via an interconnect coupling the receiving adapter and the memory, the interconnect having a configuration with ordering rules, the ordering rules indicating that the read will not complete successfully until after the data is written to the memory by the write operation.

7. The computer program product of claim 1, wherein the method further comprises checking by the receiving adapter whether the sending of the acknowledgment is to be delayed, and performing the determining based on the checking indicating that the sending of the acknowledgment is to be delayed.

8. The computer program product of claim 1, wherein the method further comprises generating based on the acknowledgment a completion queue element used to indicate completion of the write operation.

9. The computer program product of claim 1, wherein the read operation is transparent to the sending adapter.

10. A computer system for facilitating processing in a computing environment, the computer system comprising:
a receiving adapter configured to perform a method, said method comprising:
receiving at the receiving adapter from a sending adapter a write operation to be performed by the receiving adapter;
performing the write operation by the receiving adapter to write data to memory of the computing environment;
determining by the receiving adapter whether the write operation has completed, wherein the determining comprises performing by the receiving adapter a read operation to confirm the write operation has completed in that the data has been written to the memory, the read operation initiated locally by the receiving adapter and reading only a portion of the data that has been written by the write operation to determine the write operation has completed, and wherein the read operation is absent a comparing of the written data and the read data; and
based on determining via the read operation that the write operation has completed, sending an acknowledgment to the sending adapter.

11. The system of claim 10, wherein acknowledgment of the write operation is delayed until after the read operation confirms completion of the write operation.

12. The system of claim 11, wherein acknowledgment of the write operation prior to the read operation confirming completion of the write operation is avoided.

13. The system of claim 10, wherein the memory is coupled to the receiving adapter via an interconnect that facilitates the write operation, the interconnect having a configuration in which indication of completion of the write operation to the sending adapter is absent.

14. The system of claim 10, wherein the read operation reads one or more locations in memory written to by the write operation, and wherein the write operation is performed via an interconnect coupling the receiving adapter and the memory, the interconnect having a configuration with ordering rules, the ordering rules indicating that the read will not complete successfully until after the data is written to the memory by the operation.

15. The system of claim 10, wherein the method further comprises checking by the receiving adapter whether the sending of the acknowledgment is to be delayed, and performing the determining based on the checking indicating that the sending of the acknowledgment is to be delayed.

16. A method of facilitating processing in a computing environment, said method comprising:
receiving at a receiving adapter of the computing environment from a sending adapter of the computing environment a write operation to be performed by the receiving adapter;
performing the write operation by the receiving adapter to write data to memory of the computing environment;
determining by the receiving adapter whether the write operation has completed, wherein the determining comprises performing by the receiving adapter a read operation to confirm the write operation has completed in that the data has been written to the memory, the read operation initiated locally by the receiving adapter and reading only a portion of the data that has been written by the write operation to determine the write operation has completed, and wherein the read operation is absent a comparing of the written data and the read data; and
based on determining via the read operation that the write operation has completed, sending an acknowledgment to the sending adapter.

17. The method of claim 16, wherein acknowledgment of the write operation is delayed until after the read operation confirms completion of the write operation, and wherein acknowledgment of the write operation prior to the read operation confirming completion of the write operation is avoided.

18. The method of claim 16, further comprising checking by the receiving adapter whether the sending of the acknowledgment is to be delayed, and performing the determining based on the checking indicating that the sending of the acknowledgment is to be delayed.

19. A computer program product for facilitating processing in a computing environment, the computer program product comprising a non-transitory computer readable storage medium readable by a processing circuit and storing instructions for execution by the processing circuit for performing a method, the method comprising:
receiving at a receiving adapter of the computing environment from a sending adapter of the computing environment a first operation to be performed by the receiving adapter, the first operation being associated with a first acknowledgment type;
performing the first operation by the receiving adapter;
based on the first acknowledgment type indicating non-delayed acknowledgment, sending a receipt acknowledgment to the sending adapter indicating receipt of the first operation, the receipt acknowledgment not indicating completion of the first operation;
receiving at the receiving adapter from the sending adapter a second operation to be performed by the receiving adapter, the second operation being associated with a second acknowledgment type;

performing the second operation by the receiving adapter, the second operation being a write operation to write data to memory of the computing environment, the computing environment having ordering rules that permit a read operation to complete only based on pending write operations to memory having completed;

based on the second acknowledgment type indicating delayed acknowledgment, determining by the receiving adapter whether the second operation has completed in that the data is written to memory, wherein the determining comprises performing by the receiving adapter a read operation to confirm the second operation has completed, the read operation initiated locally by the receiving adapter and completing, based on the ordering rules, only if the write operation has completed; and based on determining via completion of the read operation that the second operation has completed, sending a completion acknowledgment to the sending adapter.

* * * * *